United States Patent
Birnbacher

(10) Patent No.: US 11,215,710 B2
(45) Date of Patent: Jan. 4, 2022

(54) METHOD AND DEVICE FOR OPTICAL DISTANCE MEASUREMENT

(71) Applicant: Ibeo Automotive Systems GmbH, Hamburg (DE)

(72) Inventor: Wolfgang Birnbacher, Hamburg (DE)

(73) Assignee: IBEO AUTOMOTIVE SYSTEMS GmbH, Hamburg (DE)

( * ) Notice: Subject to any disclaimer, the term of this patent is extended or adjusted under 35 U.S.C. 154(b) by 432 days.

(21) Appl. No.: 16/280,376

(22) Filed: Feb. 20, 2019

(65) Prior Publication Data
US 2019/0257948 A1    Aug. 22, 2019

(30) Foreign Application Priority Data
Feb. 21, 2018  (EP) ..................... 18157749

(51) Int. Cl.
| | |
|---|---|
| G01S 17/42 | (2006.01) |
| G01S 17/18 | (2020.01) |
| G01S 17/89 | (2020.01) |
| G01S 7/48 | (2006.01) |
| G01S 7/481 | (2006.01) |
| G01S 17/08 | (2006.01) |

(52) U.S. Cl.
CPC ............ G01S 17/42 (2013.01); G01S 7/4808 (2013.01); G01S 7/4817 (2013.01); G01S 17/18 (2020.01); G01S 17/89 (2013.01)

(58) Field of Classification Search
None
See application file for complete search history.

(56) References Cited

U.S. PATENT DOCUMENTS

| | | |
|---|---|---|
| 5,283,622 A | 2/1994 | Ueno et al. |
| 2016/0182788 A1 | 6/2016 | Wan et al. |
| 2017/0129400 A1 | 5/2017 | Subramanya |

OTHER PUBLICATIONS

Anonymous: "Time-of-flight camera", Wikipedia, the free encyclopedia, Aug. 29, 2015, pp. 1-11, XP055370991, Retrieved from the Internet on May 10, 2017, URL:[https://en.wikipedia.org/w/index.php?title=Time-of-flightcamera&oldid=678428229].
Search Report issued for corresponding European Patent Application No. EP 18 15 7749, dated Sep. 3, 2018, with an English machine translation.

*Primary Examiner* — Guerrier Merant
(74) *Attorney, Agent, or Firm* — Myers Wolin, LLC

(57) ABSTRACT

A method is provided for distance measurement that comprises performing measurements, wherein a measurement comprises sending out at least one measuring pulse and, if reflected on an object, receiving the reflected measuring pulse. Measurements are performed accounting for previous information about objects and/or open spaces within a maximum measuring range in order to varyingly measure subranges of the maximum measuring range. The method comprises defining subranges, classifying the subranges by relevance and varyingly measuring subranges, wherein relevant subranges are measured more intensively, so that more measuring pulses per spatial unit are sent out in relevant subranges. The method has a time budget, wherein the method comprises a one-time definition and/or dynamic adjustment of how the time budget is distributed among varyingly relevant subranges, wherein a first portion of the time budget is used for focus measurements, and a second portion of the time budget is used for basic measurements.

12 Claims, 3 Drawing Sheets

METHOD AND DEVICE FOR OPTICAL DISTANCE MEASUREMENT

CROSS REFERENCE TO RELATED APPLICATIONS

This application takes priority from German Application No. 18157749.5, filed on Feb. 21, 2018, the contents of which are incorporated by reference herein.

TECHNICAL FIELD

The invention relates to a method and a device for optical distance measurement.

BACKGROUND

Optical distance measurements, in particular for use in the driverless navigation of vehicles, are known from prior art. They are based on the time-of-flight principle, wherein a scanning sensor, in particular a LIDAR (short for "light detection and ranging") sensor, is used for measurement purposes, which periodically sends out measuring pulses that are reflected on objects, wherein the reflected measuring pulses are detected. By determining the propagation time of the measuring pulse from the sensor to the objects and back, the speed of light can be used to infer the distance to these objects.

In each so-called time-of-flight sensor, there are technical reasons for the maximum measuring range. The maximum measuring range is derived from a maximum visual field and a maximum range up to which reflections can be received.

In prior art, the entire maximum measuring range, i.e., the entire visual field and the entire distance range, are uniformly scanned up to the maximum range. In many applications, an attempt is made in a subsequent evaluation to find and classify objects, for example structures, by processing the measuring data obtained in this way. However, a big portion of the measuring data often turns out to be of little interest after the fact, since there is a high probability that no object will be located in a large part of the corresponding maximum measuring range. Uninteresting ranges are thus scanned just as well or poorly as interesting ones in prior art. Portions of the measuring range from which no information can be obtained are also scanned. One example would be an area of the measuring range that was covered from the outset, so that it cannot yield any reflections.

SUMMARY

An object of the present invention is to further develop a method and a device for distance measurement in such a way as to enable a logical differentiation between subranges of the measuring range. This makes it possible to improve the signal quality of the measurement, as well as to better utilize the available time budget.

The above object is achieved by a method for optical distance measurement, which comprises the performance of measurements. A measurement comprises sending out at least one measuring pulse and receiving the reflected measuring pulse, which had previously been reflected by an object. According to an embodiment of the invention, the measurements are performed taking into account previous information about objects and/or open spaces within a maximum measuring range in order to varyingly measure subranges of the maximum measuring range that vary in relevance. The method comprises defining subranges of the maximum measuring range, classifying the subranges by relevance and varyingly measuring subranges that vary in relevance, wherein relevant subranges are measured more intensively by comparison to less relevant and/or irrelevant subranges, so that more measuring pulses per spatial unit are sent out in relevant than in less relevant and/or irrelevant subranges. A focus area is classified as a relevant subrange of the maximum measuring range and/or as a more relevant subrange of a scanned measuring range by comparison to the remainder of the scanned measuring range, wherein the method comprises performing basic measurements to ensure a basic performance and focus measurements to analyze the at least one focus range in detail, wherein the basic measurements are used to measure the scanned measuring range or maximum measuring range. The method has a time budget, wherein the method comprises a one-time determination and/or dynamic adjustment of how the time budget is distributed among subranges of the maximum measuring range that vary in relevance, wherein a first portion of the time budget is used for the focus measurements, and a second portion of the time budget is used for the basic measurements.

The measuring pulse reflected by the object is a measuring pulse that was sent out previously, so that the reflection on the object changed its direction of propagation. The reflected measuring pulse can thus be understood as an echo of the sent out measuring pulse. In particular, the method serves to determine the propagation time of the measuring pulses to the objects on which the latter were reflected, after which the distance covered by the respective measuring pulse to the object is ascertained from this using the speed of light. All sent out measuring pulses here need not be reflected on objects; instead, it can be that the measuring pulses are not reflected on any object, and thus not received in the form of a reflected measuring pulse.

An optical distance measurement is characterized by the fact that distances are determined utilizing optical signals, here optical measuring pulses. The distance covered by the measuring pulse is to be understood as the stretch between the transmission element that sent out the measuring pulse and the object that has reflected it, plus the stretch between the object and the receiving element that received the corresponding reflected measuring pulse. Since the at least one object typically comprises a three-dimensional object, so that several areas of the object can be arranged closer and other areas of the object further away, the term "distance to the object" refers to the distance to at least one spot of the object, specifically the spot that was impacted by the measuring pulse and from which it was reflected. The propagation time is to be understood as the time taken by the measuring pulse for the distance described above. The method is used first and foremost for distance measurement as applied in the driverless navigation of a vehicle. To this end, the distances to all objects lying in a maximum measuring range or a scanned measuring range are determined. Above all, the method comprises a LIDAR measurement.

A measurement preferably comprises sending out several measuring pulses, above all a measuring pulse sequence. In particular, a measuring pulse comprises an optical, especially electromagnetic, signal. The measuring pulse preferably has a wavelength originating from the range not visible with the human eye. Invisible infrared is preferably used for safety reasons. A measuring pulse preferably has a pulse duration, so that the measuring pulse can be understood as a time-limited portion of electromagnetic radiation. Since the measuring pulse is an electromagnetic signal, and hence the speed of the measuring pulse is known, the stretch covered by the measuring pulse over the propagation time can be inferred from the propagation time of a measuring pulse based on the speed of light.

The term "maximum measuring range" refers above all to a three-dimensional area from which reflections of the measuring signals that were sent out can be received. A device with which the method for optical distance measurement is performed can preferably perform measurements in the maximum measuring range. The maximum measuring range is defined by a maximum visual field and a maximum range. By contrast, the maximum range defines a maximum distance range that extends proceeding from a distance measuring device and continuing all the way to the maximum range. The maximum visual field can be spread out by two angular sectors into two planes that are perpendicular to each other. In one of these planes, i.e., the two-dimensional one, the maximum visual field can be understood as an angular sector, i.e., a circle segment not limited by a circular arc. In other words, the angular sector is exclusively bounded by two circle radii proceeding from the device. The maximum visual field three-dimensionally forms a pyramid that extends into infinity in the direction of beam propagation. The maximum range limits this infinitely long pyramid in terms of its height, so that the maximum measuring range is formed. There are technical reasons for the maximum visual field and maximum range. The pyramid here preferably has an outwardly curved floor.

Embodiments of the invention provide that the measurements be performed taking into account previous information about objects and/or open spaces within a maximum measuring range, in order to varyingly measure subranges of the maximum measuring range that vary in relevance.

Previous information is to be understood as information available at a time before the measurements are performed. In other words, advance information or a priori information. The previous information preferably comprises information concerning knowledge about objects and/or open spaces within the maximum measuring range.

In particular, the previous information influences the performance of measurements. The previous information relates to objects and/or open spaces within the maximum measuring range. It must here be understood in particular that the previous information can be used to infer at least the areas, i.e., subranges of the maximum measuring range, in which objects and/or open spaces are located. As a consequence, areas of a higher relevance can be scanned more intensively, and hence resolved in more detail than areas that have less relevance. The term "scanning" refers to sending out measuring pulses, above all measuring pulse sequences, in an area, so that this area is measured. The measuring pulses or measuring pulse sequences are here sent out at slightly varying solid angles, so that the entire area can be scanned.

In another advantage, the available time budget for a scan can be used more effectively. As relates to time-of-flight based measurements, the existing time budget (T(frame)) is basically derived from two central limitations:

First of all, the waiting period after sending out a measuring pulse in prior art should measure twice the time-of-flight up to the maximum range (T(maximum range)) until a new measuring pulse can be sent out in the same area of the visual field. Otherwise, incoming reflections might not be clearly allocated to the measuring pulses that were sent out, and so-called ghost targets come about, similarly to the aliasing effect. This effect thus limits the frequency with which measurements are sent out. However, since measuring a measuring range more frequently improves the measuring quality, this limits the quality of measurement.

Second of all, hardware resources are required for sending out and receiving the measuring pulses, as well as for processing signals. In order to scan the entire maximum measuring range simultaneously, this hardware must be present for the entire maximum measuring range. The maximum measuring range can be divided into subranges, which are sequentially measured. As a consequence, a large part of the hardware resources can be configured just for a single measuring group, and used for all measuring groups. However, the entire time is resultantly divided by the number of measuring subranges, since only a percentage of the total measuring time can be used and is available for a corresponding measuring subrange. As a whole, then, given a classic time-of-flight based measurement for a homogeneous scan of the entire maximum measuring range, the frequency with which each subrange can be measured is limited, specifically to T(frame) divided by the number of subranges and divided by T(maximum range).

Because less relevant areas can be varyingly measured within the framework of the present invention, the existing time budget can be used more effectively, since time that would otherwise be used for measuring an irrelevant or less relevant range can be specifically used for measuring relevant ranges. Irrelevant subranges of the maximum measuring range are measured less intensively, since no additional information is obtained by doing so. As a consequence, the signal quality of the measuring result increases. Relevant ranges can be resolved in much greater detail over the same available time than in prior art.

The method comprises defining subranges of the maximum measuring range, classifying the latter by relevance, and varying measuring subranges that vary in relevance. To be understood by this in particular is to consider the previous information about objects and/or open spaces in the maximum measuring range for performing the measurements. An object can be understood as an item, such as a streetlight or traffic sign, a traffic-related structure, such as a street, and other traffic participants, such as a vehicle or a person, which are located in the maximum measuring range, while an open space is to be understood as an area in which no object is located.

Above all, differences in the maximum measuring range are classified into relative and/or less relevant and/or irrelevant subranges. Subranges that vary in relevance are here varyingly measured.

Relevant subranges are measured more intensively by comparison to less relevant and/or irrelevant subranges. This means that more measuring pulses per spatial unit are sent out to relevant than to less relevant and/or irrelevant subranges. The "density" of the measurements is thus higher. Irrelevant subranges can preferably not be measured at all or at least less intensively. As a consequence, the term "varyingly measured" relates above all to a varying intensity with which the subranges that vary in relevance are scanned.

In particular, the definition of subranges and classification by relevance go by information relevant to driverless navigation. For example, the subranges in which open spaces and/or objects are clearly located based on previous information could initially be determined. In a next step, the objects could be detected and categorized by relevance. Interesting objects could include other traffic participants, for example. The corresponding subranges could be categorized as relevant. Relevance could here also depend on whether the other traffic participants are moving, and at what speed. Distinct open spaces could further be classified as irrelevant.

Subranges in which it has not yet been clearly established whether (only) open space or objects are located here could here further be categorized as relevant. This would serve the purpose of examining these not yet unambiguously classified areas even more closely, since subranges categorized as relevant are scanned more intensively. After a first rough classification, a final classification could thus take place via the more intensive scanning of areas categorized as relevant but not yet unambiguously classified. In addition, an area located far away in the traveling direction could be categorized as relevant, since the vehicle is moving toward it, and a high scanning rate is intended to search for other arising traffic participants or other objects relevant in terms of driving.

Above all, the definition of subranges and classification by relevance can take place one time and/or, in particular as a function of previous information, be adjusted dynamically.

The method is preferably implemented by means of a device for distance measurement, wherein the method comprises specifying the previous information about objects and/or open spaces in the maximum measuring range based on the position of the device in relation to objects and/or open spaces in the maximum measuring range. The device is preferably secured to a vehicle, in particular to its front region, for example directly behind the front windshield, and preferably is used for the driverless navigation of the vehicle.

Possible objects for which the relative position is relevant can include static objects in particular. The term "static objects" is understood above all as all objects having a fixed position relative to the device for distance measurement. For example, this can be understood as an object, above all a component, which hides part of the maximum measuring range of the device. For example, the fixation of a protective screen of the vehicle can cover part of the maximum measuring range. Some other device for distance measurement can be understood as an object.

Alternatively, an object can be dynamic. Dynamic objects are understood as objects that move in relation to the device. For example, these can include another traffic participant, above all another vehicle, which moves relative to the vehicle to which the device is secured. Against this backdrop, a windshield wiper can also be classified as a dynamic object.

In other words, in particular previous information about the precise position of the device in relation to the position of objects and/or open spaces in the maximum measuring range are taken into account when performing the measurements. Based on the position of the device relative to objects in the maximum measuring range, hidden subranges of the maximum measuring range can be classified as irrelevant at the very outset. These subranges are measured at least less intensively, and preferably not at all.

Subranges of the maximum measuring range that are not of interest from the very outset can further be classified as less relevant or irrelevant, e.g., when an oversized measuring range is present. In other words, another device comprises part of the maximum measuring range, so that the present device no longer has to measure it. In such a case, the relative position of the devices relative to each other would be considered. The subrange that would hence not have to be measured, since it is covered by the other device, could be categorized as irrelevant.

For example, another static object can be a street. This can be implemented in particular in the case of a device for distance measurement used for monitoring traffic.

The method advantageously comprises performing scans, wherein one scan comprises several measurements, and wherein the measurements are performed taking into account previous information about objects and/or open spaces within the maximum measuring range.

In particular, the method comprises determining the previous information about objects and/or open spaces in the maximum measuring range from previous measurements. It is further preferred that the method comprises in particular performing these previous measurements, wherein objects and/or open spaces in the maximum measuring range are detected. Above all, the method comprises performing a previous scan, as a result of which the previous information is ascertained from the measuring data of the previous scan.

The previous measurements can here comprise the scan that was just concluded, or the previous information could also be ascertained based on more than just the previous scan. In the latter case, the previous information could be based on all previous measurements or scans, e.g., through the accumulation of information.

In particular, the informative advantage of previous measurements can thus be used to determine particularly interesting ranges and measure them in detail within the framework of the next scan. The previous information can be obtained from the measuring data of previous measurements through high-level processing. The latter makes it possible to determine the subranges in which objects and/or open spaces are located. As opposed to normal signal processing at a sensor level, it utilizes algorithms that also use the previous measuring data, thereby greatly improving performance with larger time constants. Sensor fusion and semantic correlations can also be used.

Alternatively or additionally, the previous information can stem from previous measurements performed with other devices for distance measurement, for example sensors. Map information, e.g., interactive maps, can further be used as previous information.

In particular, a viewing field and/or a distance range of at least one subrange of the maximum measuring range is determined once and/or dynamically adjusted taking into account previous information about objects and/or open spaces in the maximum measuring range. Above all, the visual field and/or distance range of the subrange are limited relative to the maximum measuring range.

The term "determined once" is to be construed above all to mean that something has been rigidly defined, at least for performing several measurements and/or scans, and preferably in general. If something is dynamically adjusted, it is initially defined, after which this definition is dynamically changed.

In particular, the distance range has a beginning and an end. The beginning and end are to be understood above all as a distance to a device for implementing the method, between which the distance range lies. The selected beginning of the distance range can preferably be spaced a certain distance from the device. The end could further be set at a distance to a maximum range of the maximum measuring range. As a consequence, only those measurements could be performed whose reflections stem exclusively from the distance range limited in this way.

Limiting the distance range here makes the measurements significantly more effective, and is above all even possible, since a range lying outside of this distance range had previously been categorized as irrelevant, e.g., since open space was there present with certainty. Such previous information can be considered, so that reflections and sent out measuring pulses can be allocated to each other taking this information into account, thus making it possible to preclude potential ghost objects that stem from aliasing effects and could have arisen in this range.

The subrange can here above all comprise a scanned measuring range. The measurements of a scan advantageously measure a scanned measuring range, which is defined by a visual field and a distance range. In particular, the scanned measuring range is classified as a relevant subrange, while the remainder of the maximum measuring range can be categorized as less relevant.

Limiting the visual field and/or distance range allows a scanned measuring range much smaller in design than the maximum measuring range. In particular, previously existing information about objects and/or open spaces in the maximum measuring range can thus be used to limit the range to be scanned, i.e., the scanned measuring range, into up to three dimensions. As a result, the existing time budget can be better utilized, and a better signal quality can be achieved.

Furthermore, in particular the beginning of the distance range of the scanned measuring range can be specifically set at a certain distance from a device for implementing the method, if it can be concluded from the previous information that that no relevant information is to be expected between the device and the beginning.

For example, given a device for distance measurement used to monitor traffic that is secured in a certain height above the street, for example at a crossing, the relevant scanned measuring range can be limited from two sides: It can be assumed with a very high level of probability that objects will never be expected to be in a measuring range around the position where the device is secured, so that this range can be defined as open space. Only after a range of up to a specific height proceeding from the street are objects to be expected that can reflect measuring pulses. At the same time, it can be assumed with certainty that no objects will be found below the street. As consequence, the distance range can be limited to the distance to at least one angular range of the visual field up to the street. The distance range can thus be significantly limited in at least a range of the visual field, so that the measurements can be performed more effectively.

It can further be recognized from previous measurements when a device is set up directly behind the front windshield of an automobile, in which the windshield wiper is currently blocking a part of the maximum measuring range. As a consequence, the range hidden by the windshield wiper from the very outset can specifically not be measured by the ensuing scan, since it is classified as an irrelevant range. Based on a previous measurement, for example, a strong, local contamination of a front windshield can further be detected, which makes the detection of objects impossible. As a result, negatively affected impaired subranges of the maximum measuring range can be declared as irrelevant and/or less relevant in subsequent scans, so as to thereby utilize the derived time budget for relevant subranges.

As can further be recognized, e.g., from previous measurements, no other object is located up to a distant object that has not yet been clearly detected. The range around the object that still remains to be specified in more detail could be classified as a relevant subrange. The information about the open space before this object makes it possible to set the beginning of the distance range to shortly before the presumed object for the ensuring scan, and thus to greatly limit the area to be scanned.

As can further be recognized, e.g., from previous measurements, a fixed, unmoving object is located a specific distance away, which reflects all pulses. Based on this previous information for the ensuing measurements, the distance range can be limited to the distance up to this object.

If information additionally exists about a certain open space up to a specific distance in this scenario, the beginning of the measuring range can be set up to this distance. As a consequence, the measuring range of two distance ranges can be limited.

For example, it is further possible to limit the distance range of a device for distance measurement arranged in the front area of a vehicle. It can be discerned from a previous scan or assumed from static assumptions based on the mounting position exactly how far away the street is situated, so that the selected end of the distance range can be significantly shorter. In addition, the distance range could be selected taking into account the tolerance relative to a vehicle load, which is established during acceleration or given a change while navigating ramps.

In particular a device for implementing the method comprises a transmission matrix with transmission elements. The method can comprise combining transmission elements into various groups, wherein different measuring subranges of the maximum measuring range are allocated to the groups. In particular, the subranges differ in terms of the distance range. Given a device arranged in the front area of a vehicle, transmission elements located closest to the streets (e.g., the lowermost row or lowermost rows of the transmission matrix) could have allocated to them a measuring range whose distance range has been significantly reduced, since the street limits any further continued movement of the measuring pulses. The middle rows could have allocated to them another measuring range whose distance range is larger, while another measuring range, e.g., with the largest measuring range, can in turn be allocated to the upper rows.

In particular, the subrange can be understood as a focus range. In addition, one subrange could be a scanned measuring range, and another subrange could be a focus range, whose visual fields and/or distance ranges are determined once and/or dynamically adjusted taking into account previous information about objects and/or open spaces in the maximum measuring range. In particular the twofold limitation placed on the visual angle and distance range enables a very targeted analysis of previously defined focus ranges, even with a relatively small time budget. A scanned measuring range is to be understood above all as a subrange of the maximum measuring range that is measured, while the remainder of the maximum measuring range is not measured from the very outset. The scanned measuring range could thus declare the subrange of the maximum measuring range in which measurements are even performed or from which reflections are evaluated. In particular, the scanned measuring range can be determined once. In addition, the scanned measuring range can also be dynamically adjusted.

As a consequence, the method comprises above all the definition of at least one focus range. In particular, a focus range defines a range from which more essential information for driverless navigation is to be derived via the measurements. For example, a focus range can comprises an object that was previously recognized or a subrange that still has to be classified in more detail. Above all, the focus range can be understood as a subrange of the maximum measuring range that had previously been categorized as relevant. For example, the focus range can be defined as an area around the horizontal, since objects whose detection is essential in driverless navigation are to be expected in particular there. A focus range is categorized in particular as a relevant range. The focus range is categorized as a subrange of a scanned measuring range, wherein the remainder of the scanned measuring range is categorized in particular as less relevant. The remainder of the maximum measuring range, i.e., the maximum measuring range that has not been covered by the scanned measuring range, can be categorized in particular as irrelevant. In particular, the method can measure the focus range differently than the remainder of the scanning range or the remainder of the maximum measuring range.

The method comprises performing basic measurements to ensure a basic performance and focus measurements for analyzing at least one focus range in detail. The focus measurements here measure the focus range, while the basic measurements measure the entire scanned measuring range or the maximum measuring range. In particular, the scanned measuring range is here determined once, at least for a row of scans, while the at least one focus range can be dynamically adjusted after each concluded scan. Systematically running through the focus measurements comprises above all sending out measuring pulses, specifically in a preferably constant chronological interval. In particular, the chronological interval is selected in such a way as to correspond precisely to the time required by the light to run through the focus range twice. In particular the distance range, especially its length, of the focus range plays a role for the selection, since double the length of the distance range defines the stretch that corresponds to running through the focus range twice.

A fixed, homogeneous basic performance over the entire maximum measuring range or the defined scanned measuring range is essential in particular in safety-critical applications, for example ADAS systems. This basic performance can be compared with human peripheral vision, which is good enough to perceive everything important, but delivers little detailed information.

Because it defines a focus range and dynamically adjusts it, the present method very much resembles human visual perception, which consists of peripheral vision and focused vision. While the basic measurements cover peripheral vision, the focus range relates to focused vision. This makes it possible to ensure a basic performance that is necessary or to be guaranteed, which at any time can guarantee which objects and/or areas masked by the windshield wiper cannot specifically be measured, similarly to the peripheral vision of human perception, in that the focus measurement relative to the focus range resolves the objects located there with a high level of detail. The peripheral scanned measuring range can here above all be determined once and/or dynamically adjusted.

In particular, the visual field and/or distance range of subranges of the maximum measuring range is dynamically adjusted after each concluded scan, wherein the previous information is at least updated or replaced based on the just concluded scan. The previous information is thus preferably always derived from the information resulting from the scan concluded directly before, or from the most current information of other devices for distance measurement, for example sensors. In particular, the previous information about objects and/or open spaces in the maximum measuring range is determined from the previously performed basic measurements over the entire scanned measuring range or from the maximum measuring range. The previous basic measurements here comprise in particular the basic measurements of the previous scan. While the scanned measuring range is preferably determined once, the focus range can be readjusted after each scan.

Furthermore, the method can comprise tracking recognized objects and/or determining a presumably future position of a detected object for dynamically adjusting the visual field and/or the distance range of the focus range. The term "tracking" is to be understood to mean that the position of the detected object is observed based on several sequential scans. For example, a speed of the object can be detected. This information can be used to ascertain at what position the tracked object will presumably be at a future point in time. This information can be used to adjust the focus range.

The method has a time budget, in particular per scan.

The method comprises a one-time definition and/or dynamic adjustment of how the time budget is distributed among subranges of the maximum measuring range that vary in relevance. In particular, a portion of the time budget can be used for measuring relevant subranges, while another, for example a smaller portion, can be used for less relevant subranges. For example, irrelevant subranges can contain no portion of the time budget. A first portion of the time budget is used for the focus measurements, while a second portion of the time budget is used for basic measurements. In such a case, it is further preferred that the entire time budget consist of the first portion for the basic measurements and the second portion for the focus measurements.

Increasing the time resolution enables a more precise detailed measurement of at least one relevant subrange, in particular of a focus range, of the maximum measuring range. The latter can be scanned more finely without additional evaluation hardware, as long as the increase factor of the time resolution is less than the ratio between the distance range of the focus range and maximum range. This stems from the fact that the actually necessary additional evaluation hardware, in particular as relates to the storage space for enabling the higher time resolution, is compensated by limiting the scanned measuring range or focus range by comparison to the maximum measuring range.

In another aspect, the present invention may relate to a device for optical distance measurement, wherein the device is designed to perform measurements, wherein a measurement comprises sending out at least one measuring pulse and, if the sent out measuring pulse is reflected on an object, receiving the reflected measuring pulse. The device is designed to perform the measurements taking into account previous knowledge about objects and/or open spaces within a maximum measuring range, so as to varyingly measure relevant subranges of the maximum measuring range that vary in relevance. The device is further preferably designed to implement a method described above.

The device first and foremost comprises a LIDAR sensor, which has a transmission matrix for sending out measuring pulses, and a receiving matrix for receiving reflected measuring pulses.

The term "transmission matrix" is to be understood in particular as an array of transmission elements, while a receiving matrix can be an array of receiving elements. In particular, a matrix can be understood as a three-dimensional, especially plate-shaped, body, on whose one surface the corresponding elements, transmission elements or receiving elements, are arranged. The transmission elements each preferably comprises a respective laser, so that the transmission matrix is to be understood as a laser array. The receiving elements are comprised above all of diodes, in particular avalanche photodiodes, most preferably single photon avalanche diodes, or pin diodes. The device can be designed in such a way as to combine transmission elements into various groups, wherein the groups have allocated to them varying measuring subranges of the maximum measuring range. In particular, the subranges differ in terms of their distance range. Given a device arranged in the front area of a vehicle, transmission elements located closest to the streets (e.g., the lowermost row or the lowermost rows of the transmission matrix) can have allocated to them a measuring range whose distance range is significantly reduced, since the street limits any further continued movement of the measuring pulses. Middle rows can have allocated to them a different measuring range, whose distance range is larger, while the upper rows can in turn have allocated to them a different measuring range, for example with the largest distance range.

The present invention may further relate to a computer program product that comprises a computer-readable storage medium, on which is stored a program that, once it has been loaded into the memory of the computer, allows a computer to implement a method described above, possibly in conjunction with a device described above. The invention may further relate to a computer-readable storage medium, on which is stored a program that, once it has been loaded into the memory of the computer, allows a computer to implement a method described above, possibly in conjunction with a device described above.

BRIEF DESCRIPTION OF THE DRAWINGS

Schematically shown on.

DETAILED DESCRIPTION OF PREFERRED EMBODIMENTS

Figure 1:
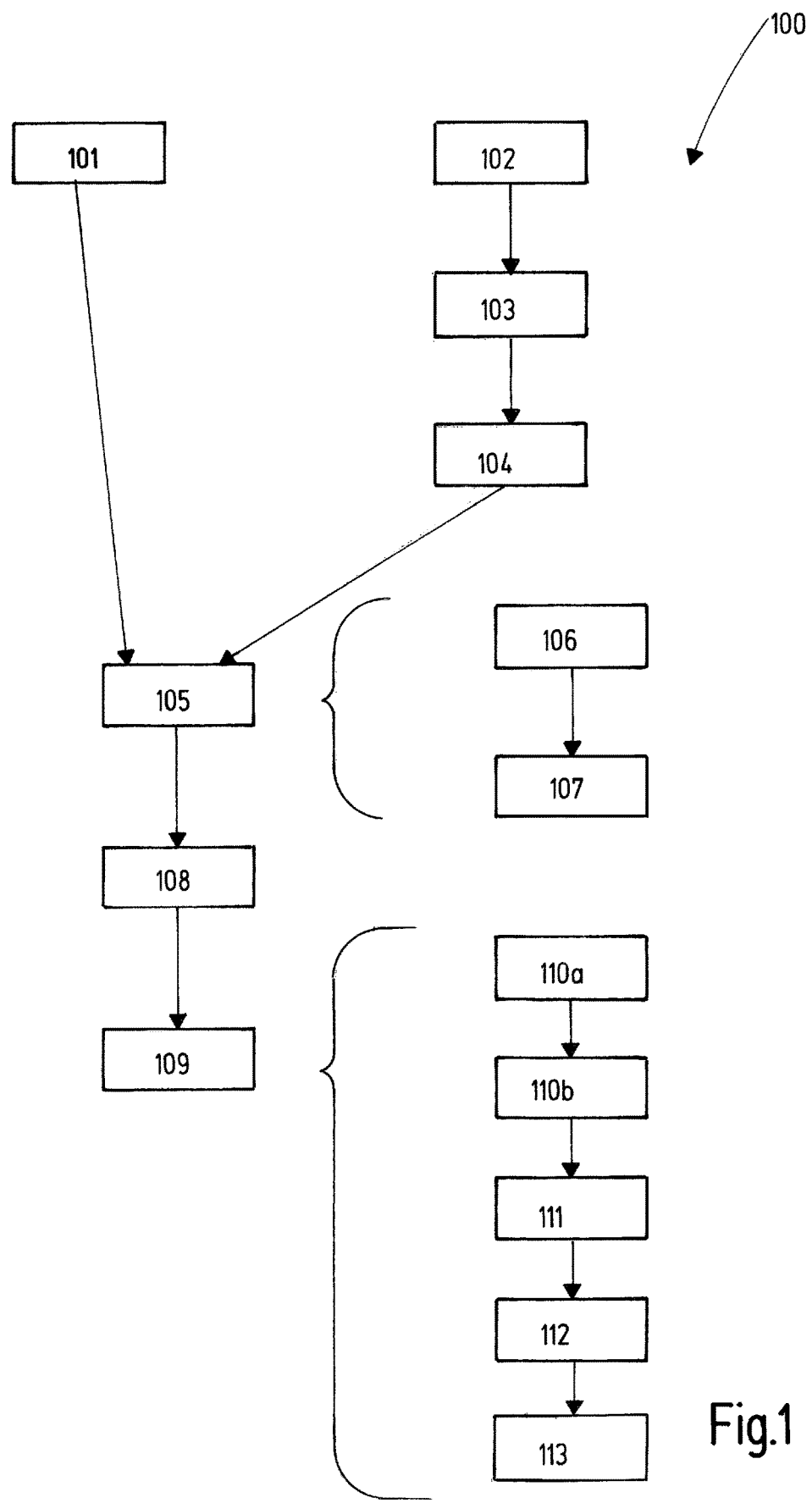
FIG. 1 is a process diagram of a method according to an embodiment of the invention.

FIG. 1 shows a method (100) according to an embodiment of the invention.

Measurements are performed (105) in the method (100) according to an embodiment of the invention. A measurement comprises sending out (106) at least one measuring pulse, in particular several measuring pulses, preferably in the form of measuring pulse sequences, and receiving (107) the at least one reflected measuring pulse after reflection on an object. Scans (108) are preferably performed. The measurements are further performed (109) taking into account previous information about objects and/or open spaces within a maximum measuring range (16).

In particular, the method comprises specifying (101) the previous information and/or determining (102) it. When the information is determined (102), this is preferably done based on performing (103) previous measurements by means of the device (10) for distance measurement. After the previous measurements have been performed (103), objects and/or open spaces in the maximum measuring range are advantageously detected (104). In particular, performing (109) measurements taking into account previous information comprises defining (110a) subranges and classifying (110b) them by relevance. In particular, relevant and/or less relevant and/or irrelevant subranges are defined (111).

The visual field (18a) and/or distance range (19a) of at least one subrange (16a) is preferably defined once and/or dynamically adjusted (112) taking into account previous information. In particular the scanned measuring range (14) is here to be understood as a subrange (16a) of the maximum measuring range (16) and/or a focus range (15).

Performing (109) measurements taking into account previous information preferably comprises varyingly measuring (113) subranges (16a) that vary in relevance. In particular, basic measurements and focus measurements can be performed (114). Furthermore, an available time budget can be defined once and/or dynamically adjusted (115), specifically to subranges (16a) of the maximum measuring range (16) that vary in relevance.

Figure 2:
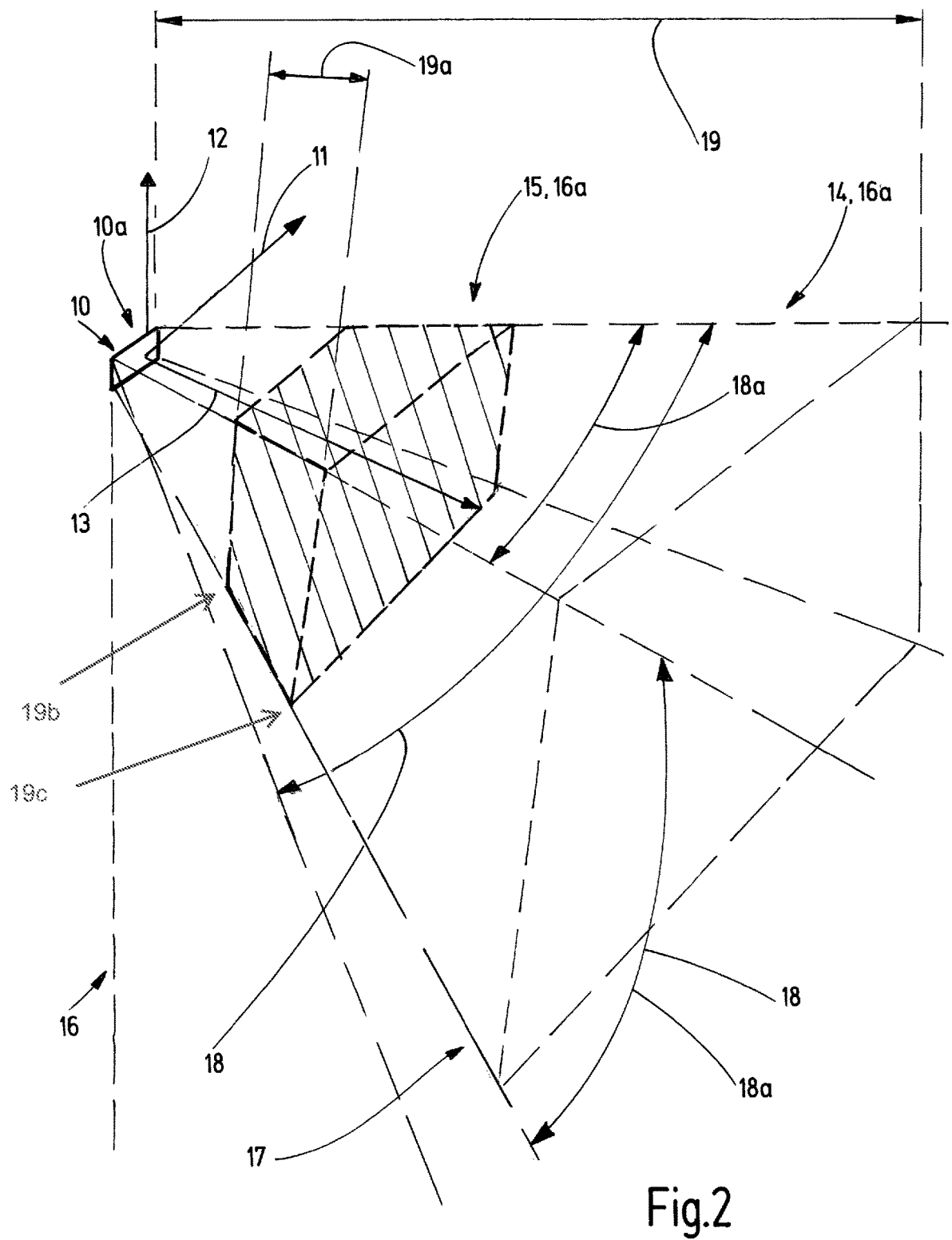
FIG. 2 is a perspective view of various measuring ranges.

FIG. 2 shows a perspective view of various measuring ranges.

A device (10) according to an embodiment of the invention is depicted, along with a coordinate system (10a), whose origin lies on the device (10). The coordinate system (10a) has an x-axis (11), a y-axis (12) and a z-axis (13).

FIG. 2 shows the maximum measuring range (16). The maximum measuring range (16) extends from the device (10) in the direction of beam propagation up to a maximum range (17). The maximum range (17) defines the maximum distance range (19), which extends proceeding from the device (10) up to the maximum range (17). The maximum measuring range (16) is further defined by the maximum visual field (18). The maximum visual field (18) is defined by two angular sectors in two planes, on the one hand in the plane spanned by the y-axis (12) and z-axis (13), and on the other hand in the plane spanned by the x-axis (11) and z-axis (13). Overall, the maximum measuring range (16) is thus shaped like a pyramid.

Visible on FIG. 2 as well is a scanned measuring range (14), which represents a subrange (16a) of the maximum measuring range (16). The scanned measuring range (14) likewise extends like a pyramid from the device (10) up to the maximum range (17). Only the visual field (18a) is limited relative to the maximum measuring range (16), in that a smaller angular sector is included in the x-z plane. The distance range of the scanned measuring range (14) is not restricted in contrast to the maximum measuring range (16).

Further visible on FIG. 2 is a focus range (15) as a subrange (16a) of the maximum measuring range (16). The visual field (18a) of the focus range (15) is not limited relative to the scanned measuring range (14). Only the distance range (19a) of the focus range (15) is limited relative to the maximum distance range (19) of the maximum measuring range (16) as well as the scanned measuring range (14). The distance range (19a) of the focus range (15) begins at a distance from the device, at the start (19a) of the distance range (19a), and ends before the maximum range (17), at the end (19c) of the distance range (19a). The focus range (15) is thus to be understood as a disk-shaped cutout from the scanned measuring range (14).

Figure 3:
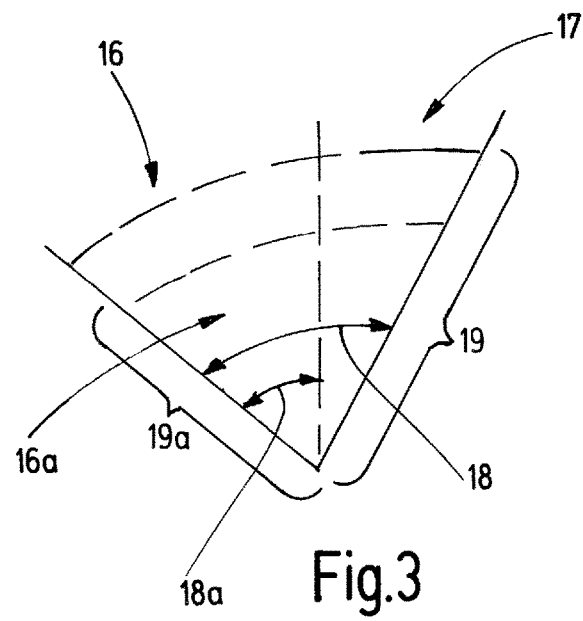
FIG. 3 is a two-dimensional view of a maximum measuring range (16) and subrange (16a)

FIG. 3 shows a two-dimensional view of a maximum measuring range (16) and a subrange (16a).

The maximum measuring range (16) is here defined by a maximum visual field (18) as well as a maximum distance range (19), which extends up to the maximum range (17). FIG. 3 illustrates how a subrange can be limited, specifically by limiting the distance range (19a) and/or visual field (18a). In a three-dimensional view, the corresponding measuring ranges are further defined by a span in the plane perpendicular to the image plane, which was omitted from FIG. 3, wherein the visual field (18a) of the subrange (16a) can also be limited in this plane that was not shown.

Figure 4:
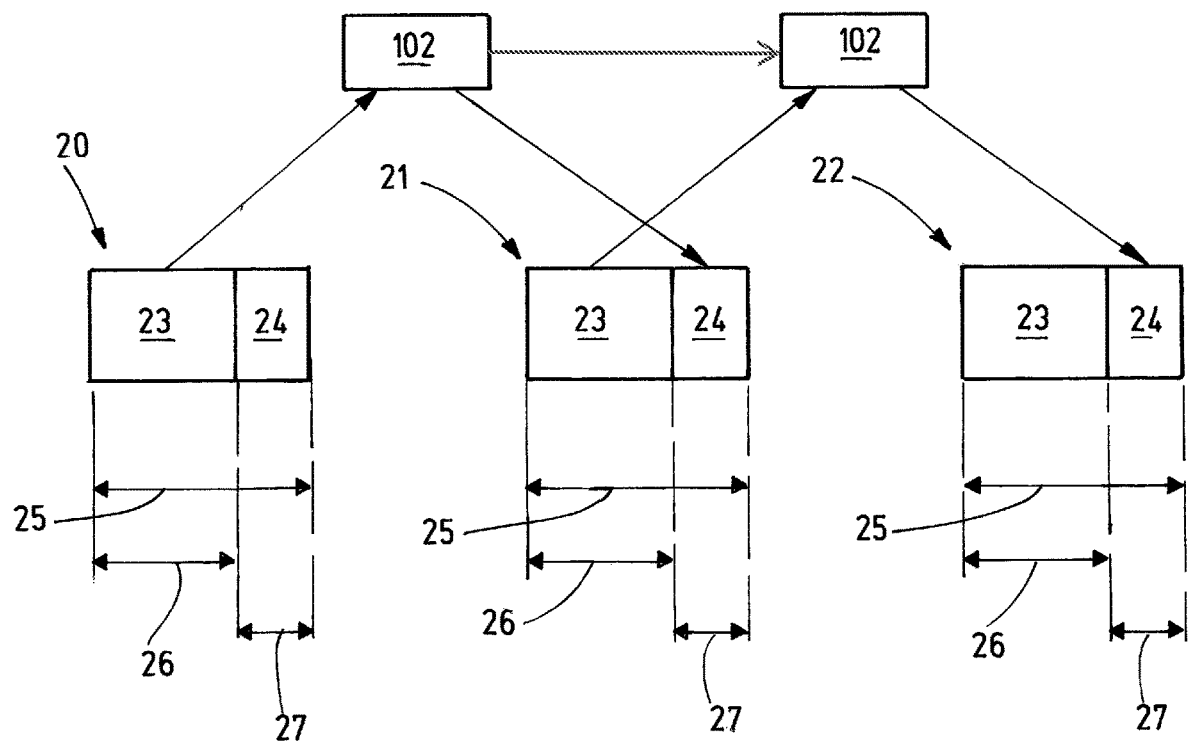
FIG. 4 is a performance of basic measurements and focus measurements, with a breakdown of the available time budget.

FIG. 4 describes the performance of basic measurements and focus measurements, and breaks down the available time budget.

Visible on FIG. 4 is a first scan (20), the time budget (25) of which has a first portion (26) and a second portion (27). The first portion (25) is used for basic measurements (22), while the second portion (26) is used for focus measurements (23). The basic measurements are used to measure the scanned measuring range (14). By contrast, the focus measurements are used to measure the focus range (15). In particular, the measuring results from the basic measurements (22) of a scan are drawn upon to determine previous information for the ensuing scan by means of a preferred high-level processing. Based on the previous information ascertained in this way, the time budget (24) and/or scanned measuring range and/or focus range can be dynamically adjusted for the subsequent scan. A second scan (21) then takes places, making use of the advantage provided by the information gained from the first scan (22). The same applies with respect to a third scan (23). FIG. 3 here also demonstrates how previous information from one scan can be relayed to another. As a consequence, the previous information can be accumulated.

REFERENCE LIST

100 Method according to an embodiment of the invention
101 Specifying the previous information
102 Determining the previous information
103 Performance of previous measurements
104 Detection of objects and/or open spaces in the maximum measuring range
105 Performance of measurements
106 Sending out at least one measuring pulse
107 Receiving the reflected measuring pulse during a reflection on an object
108 Performance of scans
109 Performance of measurements taking into account previous information about objects and/or open spaces within a maximum measuring range
110a Definition of subranges
110b Classification of subranges by relevance
111 Definition of relevant and/or less relevant and/or irrelevant subranges
112 One-time definition and/or dynamic adjustment of the visual field and/or the distance range of a subrange
113 Varying measurement of subranges that vary in relevance
114 Performance of basic measurements and focus measurements
115 One-time definition and/or dynamic adjustment of a division of a time budget into subranges of the maximum measuring range that vary in relevance
10 Device according to an embodiment of the invention
10a Coordinate system
11 x-axis
12 y-axis
13 z-axis
14 Scanned measuring range
15 Focus range
16 Maximum measuring range
16a Subrange
17 Maximum range
18 Maximum visual range
18a Visual field
19 Maximum distance range
19a Distance range
19b Beginning of distance range
19c End of distance range
20 First scan
21 Second scan
22 Third scan
23 Basic measurements
24 Focus measurements
25 Time budget
26 First portion
27 Second portion

What is claimed is:

1. A method for distance measurement, wherein the method comprises performing measurements,
wherein a measurement comprises sending out at least one measuring pulse and, if the sent out measuring pulse is reflected on an object, receiving the reflected measuring pulse,
wherein the measurements are performed taking into account previous information about objects and/or open spaces within a maximum measuring range in order to varyingly measure subranges of the maximum measuring range that vary in relevance,
wherein the method comprises defining subranges of the maximum measuring range, classifying the subranges by relevance and varyingly measuring subranges that vary in relevance,
wherein relevant subranges are measured more intensively by comparison to less relevant and/or irrelevant subranges, so that more measuring pulses per spatial unit are sent out in relevant than in less relevant and/or irrelevant subranges,
wherein a focus area is classified as a relevant subrange of the maximum measuring range and/or as a more relevant subrange of a scanned measuring range by comparison to the remainder of the scanned measuring range,
wherein the method comprises performing basic measurements to ensure a basic performance and focus measurements to analyze the at least one focus range in detail, wherein the basic measurements are used to measure the scanned measuring range or maximum measuring range,
wherein the method has a time budget,
wherein the method comprises a one-time definition and/or dynamic adjustment of how the time budget is distributed among varyingly relevant subranges of the maximum measuring range, wherein a first portion of the time budget is used for the focus measurements, and a second portion of the time budget is used for the basic measurements.

2. The method of claim 1, wherein the method is performed by means of a device for distance measurement,
wherein the method comprises specifying the previous information about objects and/or open spaces in the maximum measuring range based on the position of the device in relation to objects and/or open spaces in the maximum measuring area.

3. The method of claim 2, wherein the objects are static objects.

4. The method of claim 1, wherein the method comprises performing scans,
wherein one scan comprises several measurements, and
wherein the measurements are performed taking into account previous information about objects and/or open spaces within the maximum measuring range.

5. The method of claim 1, wherein the method comprises determining the previous information about objects and/or open spaces in the maximum measuring range from previous measurements.

6. The method of claim 5, wherein the method comprises performing previous measurements,
wherein objects and/or open spaces in the maximum measuring range are detected.

7. The method of claim 1, wherein a viewing field and/or a distance range of at least one subrange of the maximum measuring range is defined once and/or is dynamically adjusted taking into account previous information about objects and/or open spaces in the maximum measuring range.

8. The method of claim 7, wherein the distance range has a beginning and an end,
wherein the beginning of the distance range is set at a certain distance from the device for implementing the method, and/or the end is set at a distance to a maximum range of the maximum measuring range.

9. The method of claim 1, wherein the scanned measuring range is defined once, at least for a row of measurements and/or scans,
wherein the focus range is dynamically adjusted.

10. A device for optical distance measurement,
wherein the device is designed for performing measurements,
wherein a measurement comprises sending out at least one measuring pulse and, if the sent out measuring pulse is reflected on an object, receiving the reflected measuring pulse,
wherein the device is designed for performing the measurements taking into account previous information about objects and/or open spaces within a maximum measuring range in order to varyingly measure subranges of the maximum measuring range that vary in relevance, wherein the device is designed for implementing a method according to claim 1.

11. A computer program product that comprises a non-transitory computer-readable storage medium, on which is stored a program that, once it has been loaded into the memory of the computer, allows a computer to implement a method according to claim 1.

12. A non-transitory computer-readable storage medium, on which is stored a program that, once it has been loaded into the memory of the computer, allows a computer to implement a method according to claim 1.

* * * * *